United States Patent [19]

James, III

[11] Patent Number: 5,251,165
[45] Date of Patent: Oct. 5, 1993

[54] TWO PHASE RANDOM NUMBER GENERATOR

[76] Inventor: J. Colin James, III, 8250 W. 44th Ave., Wheat Ridge, Colo. 80033-4427

[21] Appl. No.: 865,474

[22] Filed: Apr. 9, 1992

[51] Int. Cl.⁵ ............................................. G06F 1/02
[52] U.S. Cl. ............................................. 364/717
[58] Field of Search ............... 364/717, 717.5; 380/46

[56] References Cited

U.S. PATENT DOCUMENTS

| | | |
|---|---|---|
| 3,548,174 | 12/1970 | Knuth . |
| 3,811,038 | 5/1974 | Reddaway . |
| 4,047,008 | 9/1977 | Perkins . |
| 4,355,366 | 10/1982 | Porter . |
| 4,408,298 | 10/1983 | Ruhland . |
| 4,493,046 | 1/1985 | Watanabe ............................ 364/717 |
| 4,791,594 | 12/1988 | Harney et al. . |
| 4,890,252 | 12/1989 | Wang . |
| 4,901,264 | 2/1990 | Hayashi . |
| 5,034,906 | 7/1991 | Chang et al. ....................... 364/717 |

OTHER PUBLICATIONS

Knuth, "The Art of Computer Programming", Second Edition, vol. 2, Seminumerical Algorithms, 1981, pp. 25-33.
Algorithms, Robert Sedgewick, Chapter 3, 1983.

Primary Examiner—Tan V. Mai
Attorney, Agent, or Firm—Fields, Lewis, Pittenger & Rost

[57] ABSTRACT

A random number generator is shown with a two phase operation, the two phases operating to increase the measured randomness of the numbers generated at very little additional cost. The first phase of operation uses conventional techniques to generate an intermediate random number. This intermediate random number is then used by the second phase to generate two potential final random numbers. One of these is picked to be the resultant random number based on whether a specified bit of the intermediate random number is set.

10 Claims, 9 Drawing Sheets

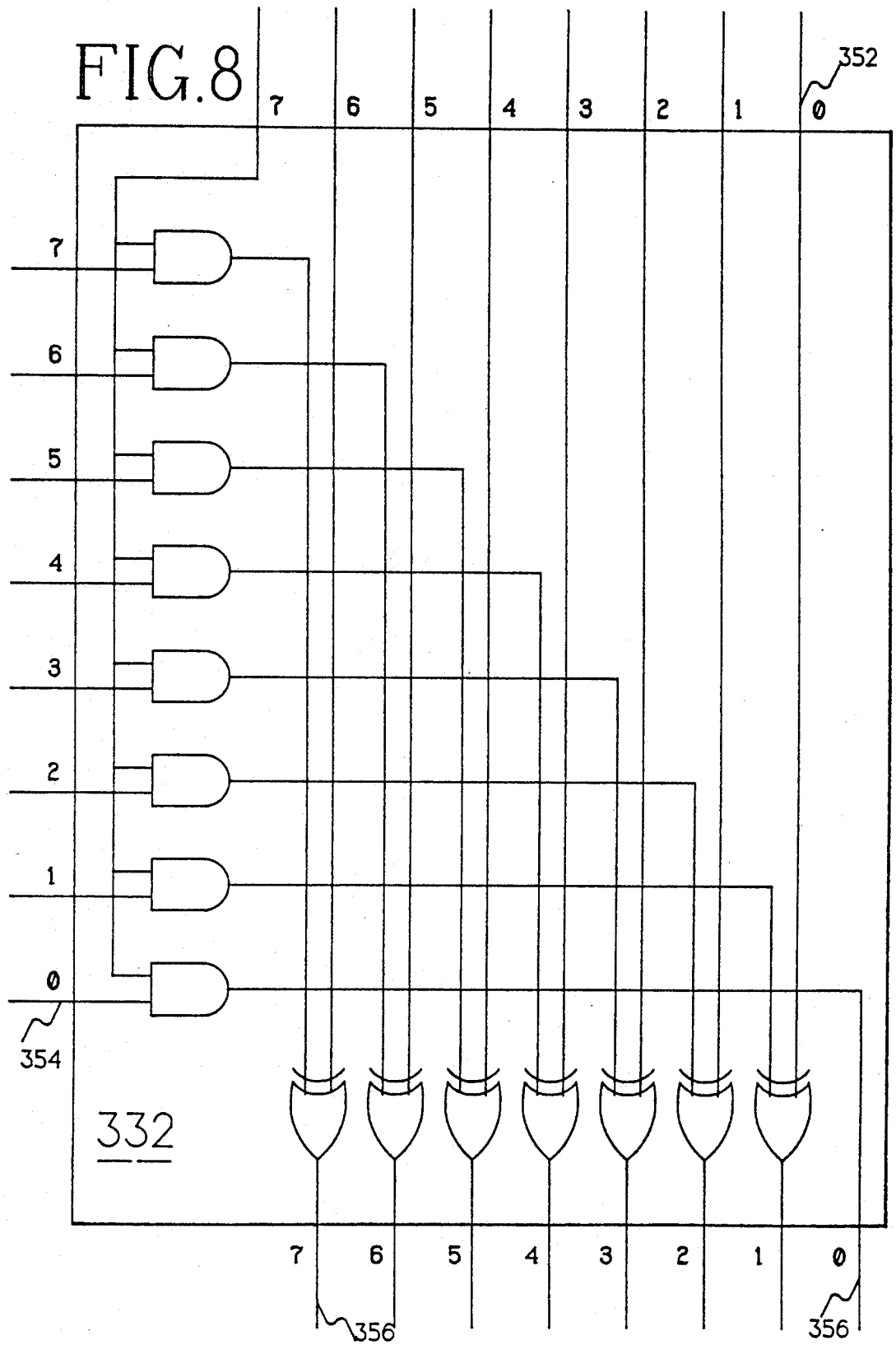

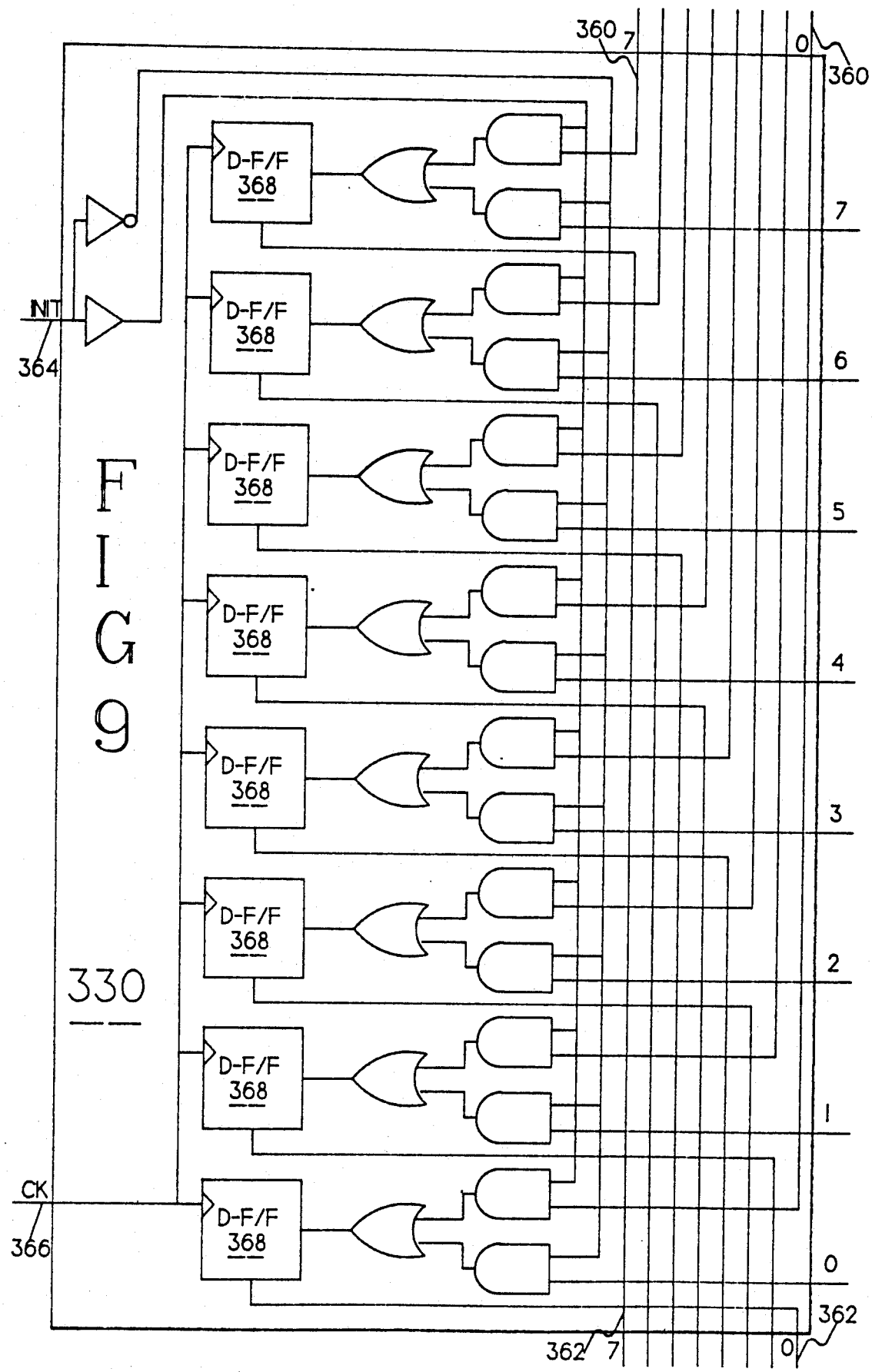

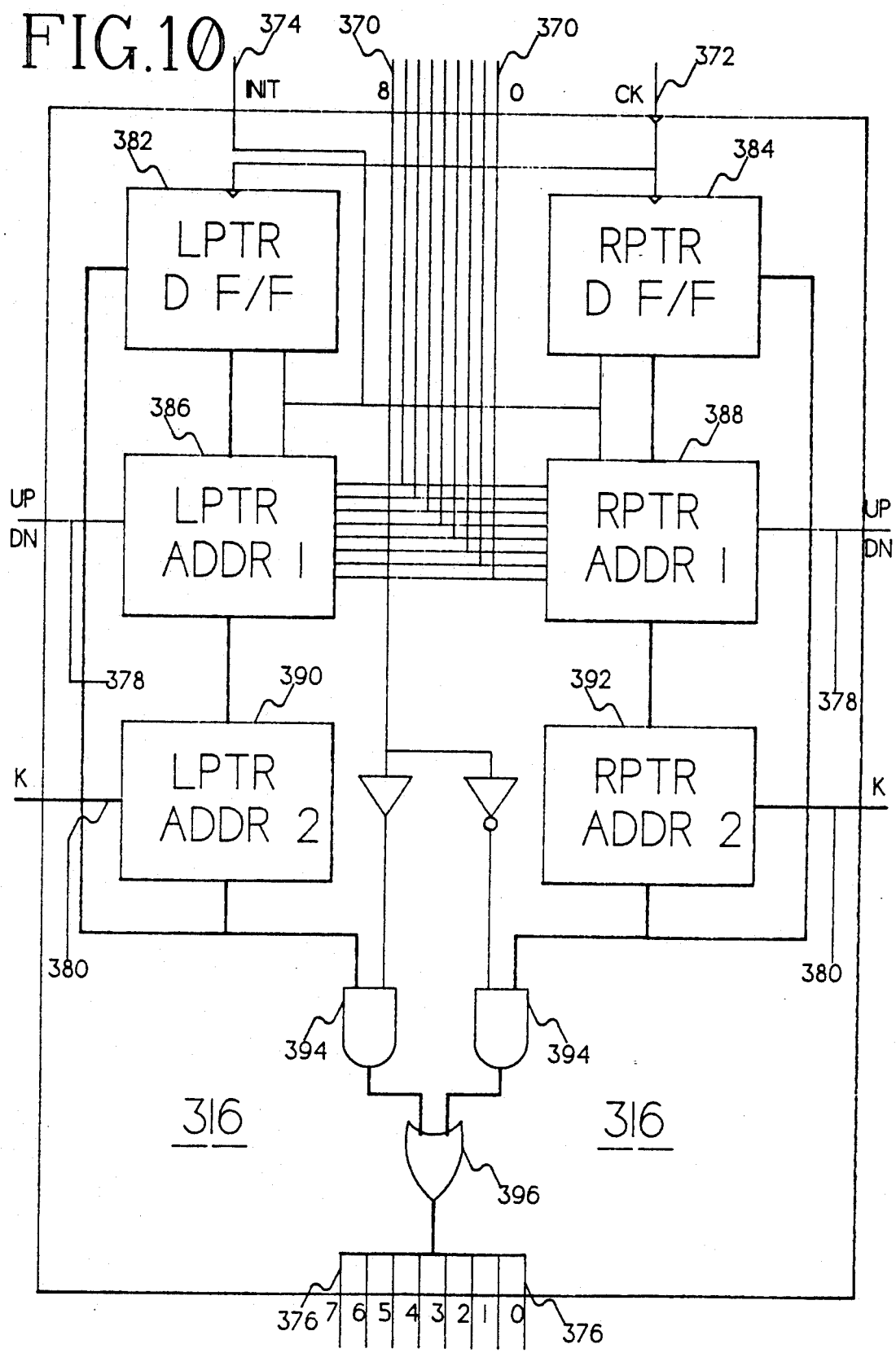

TWO PHASE RANDOM NUMBER GENERATOR

TECHNICAL FIELD

This invention relates to devices for generating a series of random numbers.

BACKGROUND ART

Random number generators have many uses in conjunction with computer applications. They are used in simulation. They are used in communications. For example, such numbers can be used in Ethernet adapters for retransmission when collisions occur. Random numbers can also be used for encryption and decryption of data.

Many of the random number generators available use some electrical phenomenon to generate their random numbers. They can be fast, and the random numbers generated can be quite random. These random number generators cannot generate reproducible sequences of random numbers. Thus, they are useless for simulation, encryption, and decryption.

There are available several random number generators that do generate reproducible sequences of random numbers. The sequence of numbers generated invariably do not perform well according to standard tests applied to determine randomness. The ones that do produce somewhat more random sequences are usually slow.

The present invention produces a reproducible sequence of highly random numbers efficiently. These numbers test as being significantly more random than those of the other methods tested that produced reproducible random number sequences.

The current invention produces its stream of highly random numbers in two phases. First, an intermediate random number is generated by a standard method. Then, the intermediate random number is combined with a history of previous intermediate random numbers to generate a final or output random number. The second step or phase increases the randomness of the numbers produced significantly.

The following is the prior art known to the inventor that might be pertinent to the patent examiner in the examination of this patent.

U.S. Pat. No. 3,548,174 by Donald Knuth describes a generator that produces a reproducible sequence of random numbers. The Knuth invention is a one phase generator. By using a two phase process or apparatus, the instant invention is capable of generating numbers that are significantly more random.

U.S. Pat. No. 3,811,038 by Stewart Reddaway describes a random number generator where the numbers generated follow a Gaussian distribution instead of a uniform distribution. This Gaussian distribution generator by its very nature generates some numbers significantly more frequently than others. The numbers generated by the instant invention follow a uniform distribution.

U.S. Pat. No. 4,047,008 by Frank Perkins describes a random number generator that depends on random access memory to replace shift registers. It generates long pseudo random bit sequences slowly. It has sacrificed statistical randomness for the ability to generate long bit sequences.

U.S. Pat. No. 4,355,366 by Sigmund Porter describes an apparatus for generating random numbers based on the use of white noise. The series of random numbers produced is not reproducible, and is therefore unusable in many applications.

U.S. Pat. No. 4,408,298 by Kim Ruhland describes a special purpose random number generator that produces a succession of numbers manifesting solely three values at random from two-bits Statistical randomness has been sacrificed for speed.

U.S. Pat. No. 4,791,594 by Kevin Harney et al. describes a random number generator where the numbers returned correspond to input indices, such that given a specific seed, whenever a specific index is used, the same random number is returned. Its primary use is with video games. It is custom tailored for video game applications, and has sacrificed statistical randomness for the ability to randomly access the numbers in a random number sequence.

U.S. Pat. No. 4,890,252 by Charles Wang describes a random number generator that sacrifices statistical randomness for an increased period.

U.S. Pat. No. 4,901,264 by Mishio Hayashi describes a random number generator that extracts partial numbers from random access memory of a computer, building each random number generated from a plurality of such partial random numbers. The instant invention does not require an array or table of numbers as does the Hayashi invention.

*Algorithms* by Robert Sedgewick, Addison-Wesley Publishing, ISBN 0-201-006672-6, has a chapter on random numbers. A two phase random number generation algorithm is described in which random numbers are stored in a table in the first phase, and extracted in a pseudo-random order from the table in the second phase. No such table is required in the present invention.

*The Art of Computer Programming*, Second Edition, Volume 2, *Seminumerical Algorithms*, by Donald E. Knuth, Addison-Wesley Publishing, ISBN 0-201-03822-6, contains the same random number generation algorithm as found in the Knuth patent listed above. Several extremely similar algorithms are also shown. No two phase random number generators are shown.

DISCLOSURE OF THE INVENTION

The present invention increases the measured randomness of numbers generated by a random number generator at very little additional cost by using a two phase method of generation. The first phase uses a conventional random number generator to generate an intermediate random number. This intermediate random number is then the input into the second phase, resulting in a more random number generated. The second phase operates by selecting one of two potential random numbers based on whether a specified bit is set in the intermediate random number.

BRIEF DESCRIPTION OF THE DRAWINGS

Details of this invention are described in connection with the accompanying drawings which like parts bear similar reference numerals in which:

FIG. 8 is a circuit diagram showing the subcircuit for generating an intermediate random bit. This subcircuit is duplicated for each bit of the intermediate random number generated by the first random number generating means of the second embodiment of the invention.

FIG. 9 is a circuit diagram showing the "state4" clocked register. This circuit contains the updated "seed" value for the first random number generating means of the second embodiment of the invention. The seed value is updated at each clock pulse.

FIG. 10 is a circuit diagram showing the second random number generator of the second embodiment of the invention.

DETAILED DESCRIPTION

The present invention increases the measured randomness of numbers generated by a random number generator by using a two step or two phase process. The first phase generates an intermediate random number with a method similar to that employed by Knuth above.

The second phase, using very few instruction cycles, significantly increases the measured randomness of the random numbers generated. The intermediate random number generated by Phase 1 is used to increment or decrement two index registers into a circular array. The two index registers either increment or decrement at different rates, or one increments while the other decrements. After incrementing and/or decrementing the two index registers, they are normalized to point within the circular array. This is optimally done by masking (logical AND) the registers. A specified bit in the intermediate random number supplied to Phase 2 random number generation is tested. Usually a bit indicating a number greater than or equal to the size of the circular array is used for the test. If the tested bit is set, one of the two index registers is used. Otherwise the other register is used. The appropriate index register is then used to index into the circular array, returning a random number statistically more random than if only Phase 1 had been used.

The preferred embodiments described herein implement the above described two phase random number generator as an independent subsystem. The embodiments have five input parameters: 1) means of controlling the number of random numbers to generate, 2) means of providing the address of an array in which to place the generated random numbers, 3) means of providing a random number seed, 4) means of providing a mask value, and 5) means for specifying the number of bits of random number to generate. The specified number of random numbers would be generated in the specified array, with the specified number of digits in each random number generated. Duplicating seed and mask values would allow a sequence of random numbers to be duplicated. Generally, the number of bits of a random number to generate is a constant. Note that even though the three disclosed embodiments show the claimed invention implemented as a separate subsystem attached to a general purpose computer, it is possible to implement the claimed invention entirely in software.

Figure 1:
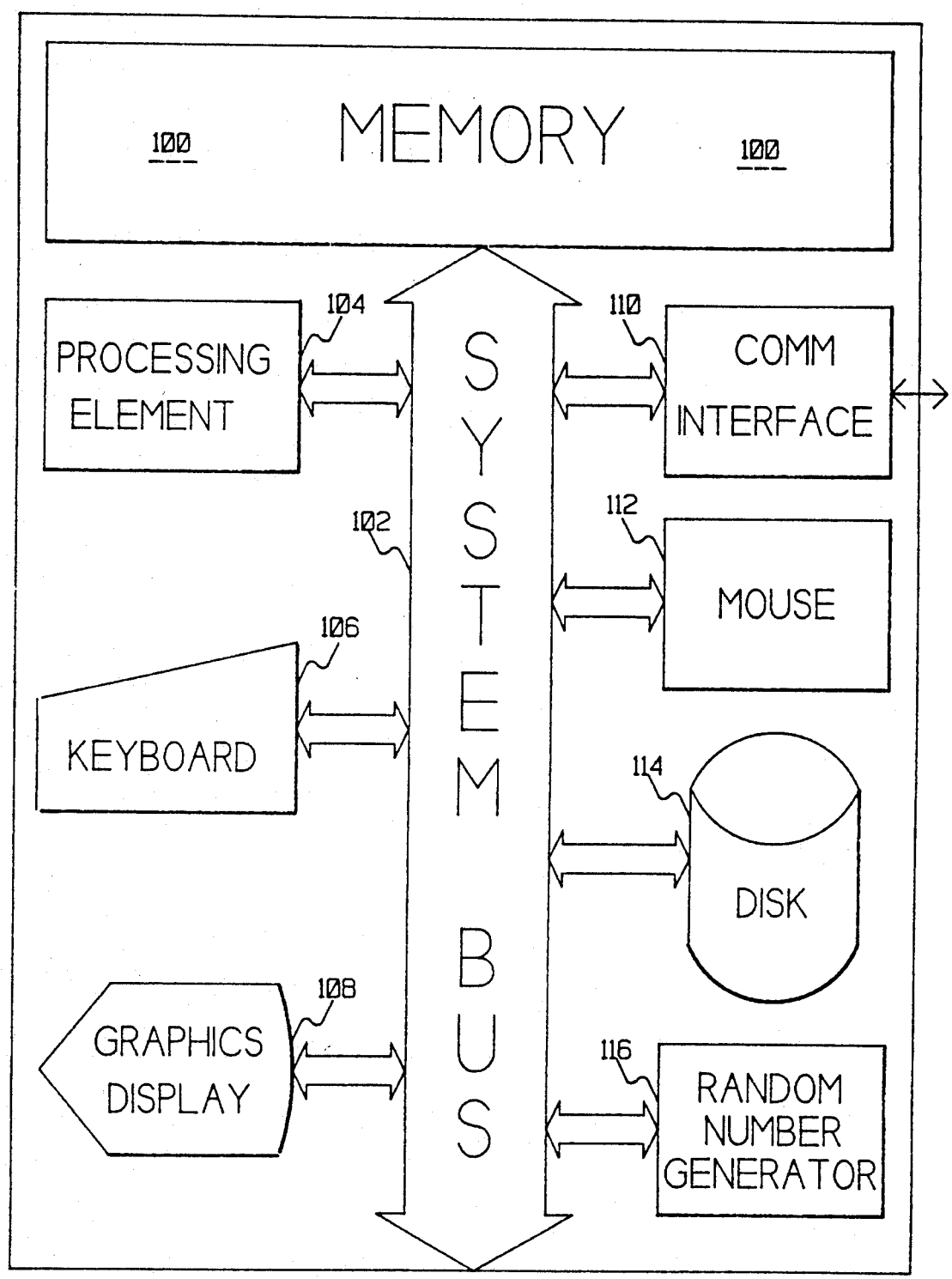
FIG. 1 is a block diagram showing the parts of a general purpose computer to which is connected a random number generator.

Referring now to FIG. 1, a general purpose computer is shown. It contains memory 100, a system bus 102, to which is connected a processing element (CPU) 104, keyboard 106, a graphic display monitor 108, a communications interface 110, a mouse 112, and one or more disk drives 114. In the instant invention, a random number generator 116 is a)so connected to the bus 102.

Three different embodiments of the random number generator 116 are shown and described herein. The first and third embodiments show a random number generator established in ROM or EEPROM. Upon activation, the generator would require five parameters: 1) number of random numbers to generate, 2) address of array in which to place the generated random numbers, 3) a random number seed, 4) a mask value, and 5) the number of bits of random number to generate. The last parameter can be static (hard coded). The random number generator would operate by generating the specified number of random numbers in the array starting at the address specified.

The first embodiment of the random number generator would utilize the processing element 104 of the general purpose computer in FIG. 1. The third form of the random number generator would operate similar to the first, except that a second, dedicated, processing element would be used. This has the advantage of freeing up and unloading the general purpose processing element 104, since the random number generator could operate While the processing element 104 is performing other work. Additionally, an optimized, special purpose processor could be used. For example, a RISC (Reduced Instruction Set Computer) architecture could be used. No floating point instructions are necessary. This method would be especially useful in situations where a large number of random numbers are needed, such as in communications.

The second embodiment of the random number generator is even more optimized. Random numbers of a set bit length would always be generated. One random number would be generated each major clock cycle of the generator.

This would be done by "unrolling" the program executed by the first and third embodiments. In the first random number generating means (Phase 1-FIG. 5), if an eight bit random number is required, instead of performing the inner loop (254 to 272 of FIG. 5) eight times, an eight stage apparatus would be used. Instead of shifting left one bit 270 at each stage, and saving the low order bit in another register 272, the low order bit at each stage would directly go to Phase 2, while the upper seven bits would feed the next stage. Phase 2 (FIG. 4) is straight forward, except that the RPTR and LPTR pointers are best implemented as registers, realized here as parallel clocked D-Flip/Flops, updated 232, 234 by the clock pulse 308. The State4 variable in Phase 1 (FIG. 5) would also be implemented as a register, realized as parallel clocked D-Flip/Flops, updated (FIG. 5) 266, 268 by the clock pulse. (Note—the clock frequency required is dependant upon the gate delays of the apparatus, said frequency being almost directly proportional to the number of bits of random number to be generated).

The second embodiment of the random number generator would have the advantage of speed over the other two embodiments. One random number would be generated for each clock pulse. One disadvantage is the algorithm's lack of flexibility: only a fixed number of bits can be generated. This has a bearing on the cycle at which the random numbers repeat. Secondly, only one random number is produced at any one time.

Figure 2:
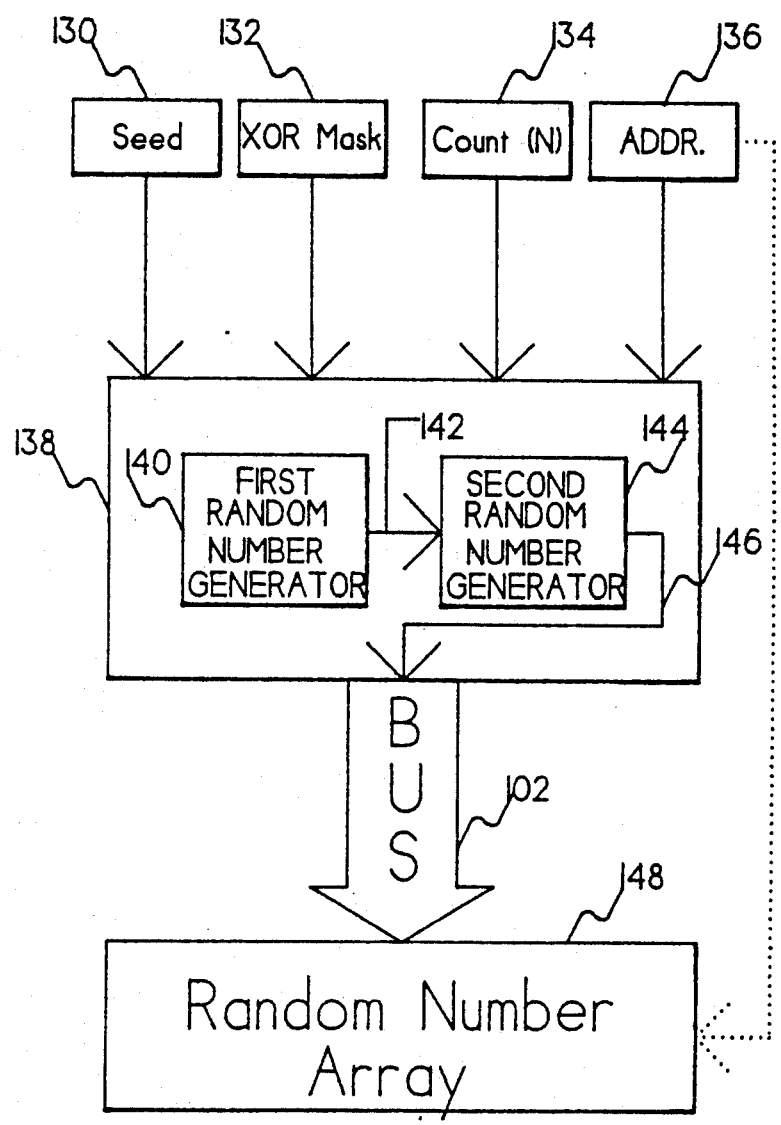
FIG. 2 is a block diagram showing the first embodiment of the random number generator.

Referring now to FIG. 2, the first embodiment of the random number generator 116 is shown. The random number generator has four inputs, normally found in registers. The first input register 130 contains a seed value. Reproducing the seed value allows a sequence of random numbers to be repeated. Different values of the seed result in different random number sequences.

The second input register 132 contains an XOR mask. This mask is used in connection with the seed value in the first random generating means portion of the program to generate intermediate random numbers. The XOR mask is "XOR"ed into an intermediate seed value variable or register (State4) 268 when a specified bit in the intermediate seed is not set (see FIG. 5). As with the seed register value, different XOR mask values result in the generation of different random number sequences.

The third input register 134 contains a count (N) value. This is the number of random numbers to generate. The fourth input register 136 contains the address of an random number array 148 in which to store the random numbers generated by the random number generator 138 (the dotted line in FIG. 2 indicates the logical relationship between the register containing the array address and the array itself). Note that in this implementation, the number of bits in each random number generated is assumed to be a constant. This results in more efficient code, at the expense of flexibility. Alternately, the number of bits could be input to the random number generator in a fifth input register.

The random number generator 138 consists of a program established in ROM or an EEPROM. The ROM or EEPROM containing the program can be on a separate circuit board attached to the bus 102, or it may be directly attached to either the system memory 100 or the processing element 104. In any case, the random number generator code is executed by the system processing element 104.

The random number generating program consists of two parts, a first random number generator (Phase 1) 140, and a second random number generator (Phase 2) 144. The first random number generator 140 utilizes the seed register 130, XOR mask register 132, and the count register 134 to generate the specified (in the count register) number of intermediate random numbers 142. The second random number generator routine utilizes the intermediate random numbers 142 generated by the first random number generator routine 140 to generate a specified number (in the count register 134) of final random number 146. Each of these final random numbers is stored in the random number array 148 specified by the random number array address register 136. Note that FIG. 2 presumes storage via the system bus 102 of the final random numbers 146 in the random number array 148. It should be noted that Direct Memory Access (DMA) storage of the final random numbers would also be possible.

Figure 3:
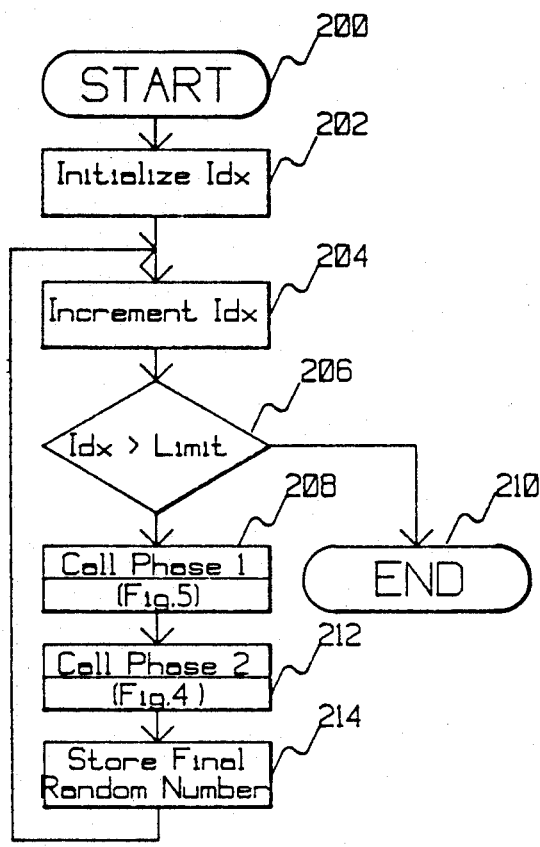
FIG. 3 is a flow chart showing the upper level of logic of the program executed in the first and third embodiment of the invention.

Referring now to FIG. 3, the outer loop of the flow chart for the program executed in embodiments one and three is shown. The Idx index variable is initialized 202, then incremented 204 the specified number of times 206 at which time the routine exits 210. Within the loop, Phase 1 208 and Phase 2 212 random number generators are invoked. The resulting random number is stored in the specified array 214, at a location dependant upon the index variable Idx.

Figure 4:
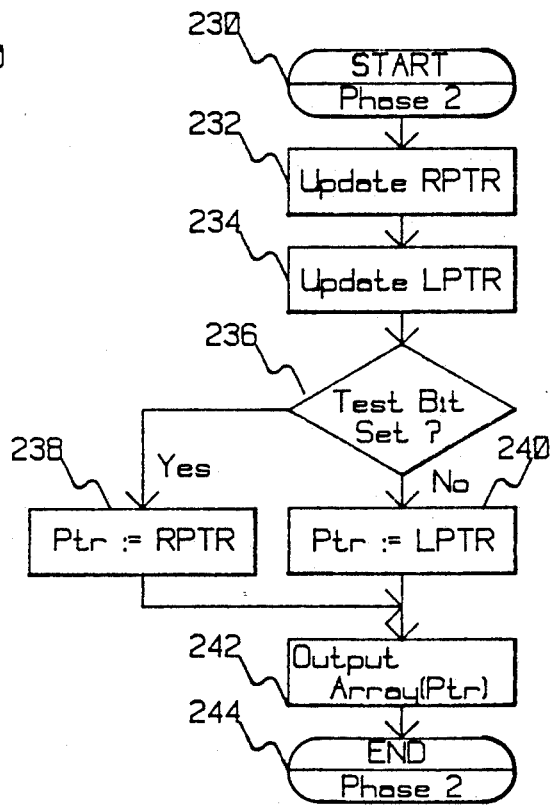
FIG. 4 is a flow chart showing the second random number generating means (Phase 2) portion of the program executed in the first and third embodiment of the invention.

Referring now to FIG. 4, a flow chart for the second random number generator (Phase 2 random number generator) 144 is shown. Phase 2 is entered 230 with an intermediate random number from Phase 1 (FIG. 5) as an argument or parameter. This intermediate random number is used to update the RPTR 232 and LPTR 234 index registers. RPTR and LPTR are index registers indexing a circular array of final random numbers. After each update, RPTR and LPTR are normalized to index within the circular array. This can be done by modular division. The preferred embodiment uses a power of two for the length of the circular array, allowing masking (logical AND) to replace the modular division.

Two different methods of updating RPTR 232 and LPTR 234 are disclosed. First, each time Phase 2 is invoked, one index register can be incremented by a value equal to the intermediate random number argument to Phase 2 processing. The second index register is incremented by a value equal to the intermediate random number argument plus a set amount. Thus, the two pointers progress by different amounts for each execution of Phase 2 processing.

The second method of updating RPTR 232 and LPTR 234 involves incrementing RPTR and decrementing LPTR by an amount equal to the intermediate random number argument to the Phase 2 processing. RPTR advances to the right, and LPTR advances to the left.

After updating and normalizing RPTR 232 and LPTR 234, one of the bits of the intermediate random number is tested 236. This bit is usually a bit that is not used in updating RPTR and LPTR due to it corresponding to a power of two number as large or larger than the circular array. If the specified bit is set, one of the index registers is used to index the circular array, while the other index register is used to index the circular array if the specified bit is not set 238, 240. The resulting index value is used to index the circular array 242, returning a final random number to the outer loop 244.

Figure 5:
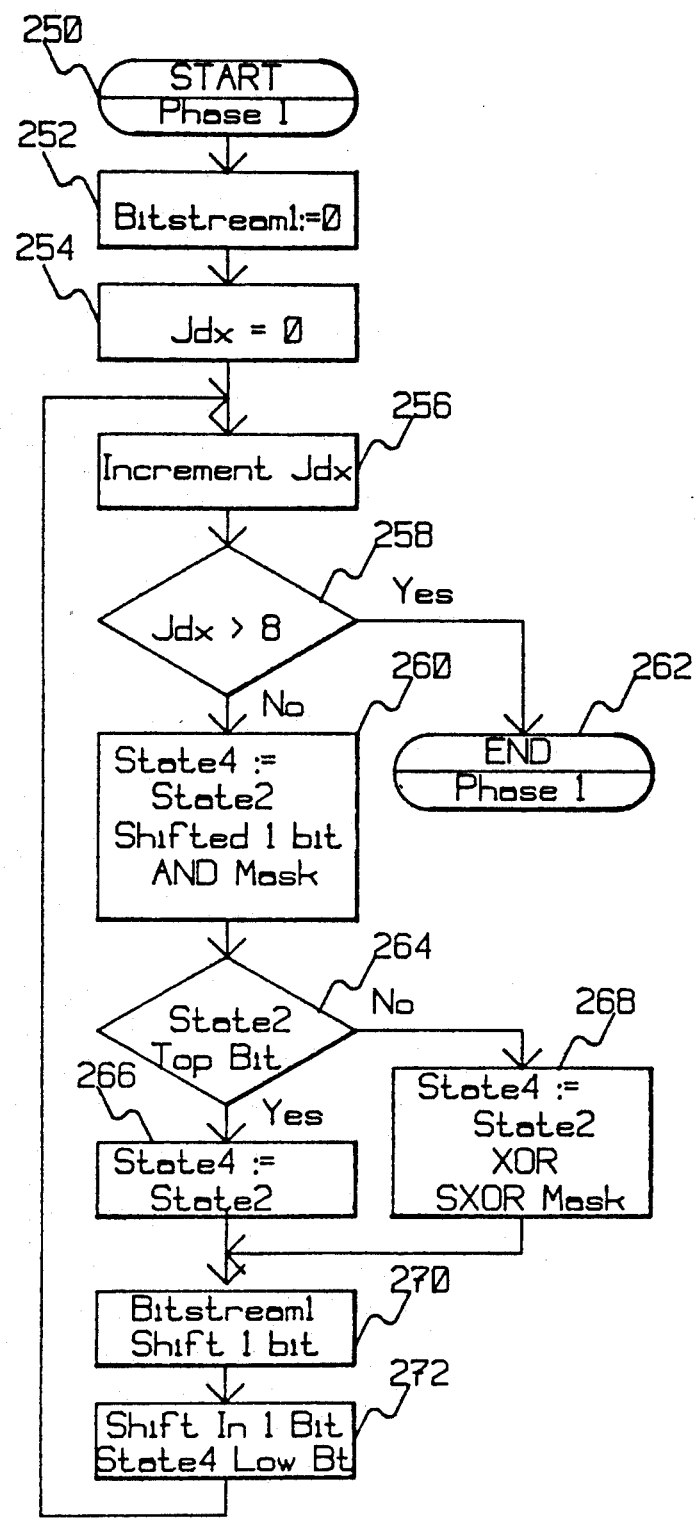
FIG. 5 is a flow chart showing the first random number generating means (Phase 1) portion of the program executed in the first and third embodiment of the invention.

Referring now to FIG. 5, the flow chart for the first random number generator (Phase 1 random number generator) 140 is described. The Phase 1 random number generator is entered 250. The output register 252 and loop count register 254 are initialized. The loop count register (Jdx) is incremented 256 the specified number of times 258, at which time Phase 1 random number generation is complete 262. The inner loop is normally iterated once for each bit of intermediate random number required. For example, if an eight bit intermediate random number is required, the loop would be repeated eight times.

During each repetition of the loop, the seed register is logically shifted left (zero fill) one bit 260. A specified bit, usually the most significant bit returned, is tested 264. If the bit tested is set, the specified mask value is XORed into the seed register 268 (otherwise unchanged 266). At this point, a specified bit in the register holding the seed value is masked and shifted into a register holding the intermediate random number being generated 270, 272. Prior to iterating the loop 256, the intermediate random number is normalized to fall within the specified range. This normalization is usually done by masking (logically AND).

Figure 6:
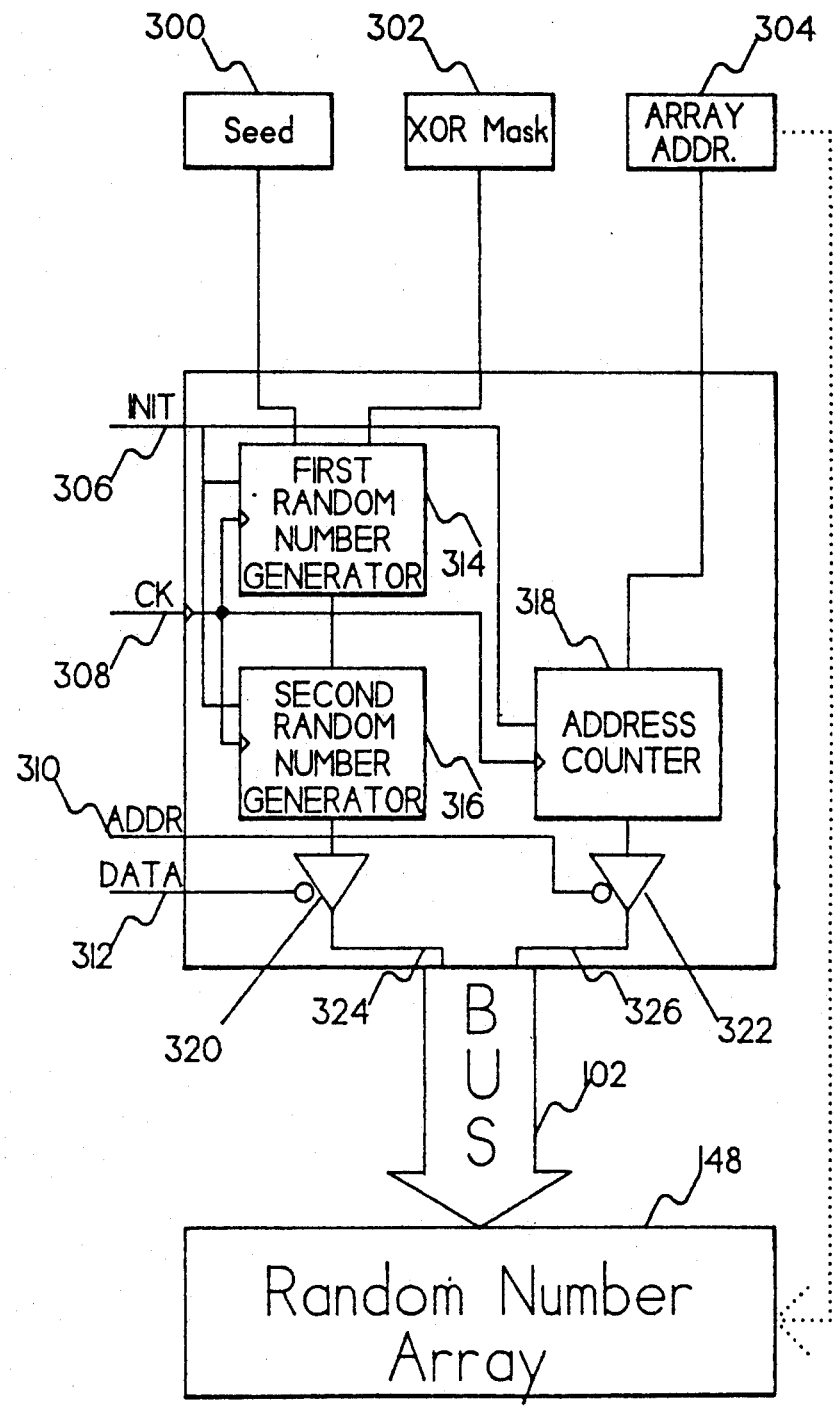
FIG. 6 is a block diagram showing the upper level of logic for the second embodiment of the invention.

Referring now to FIG. 6, the second embodiment of the invention is shown. This embodiment generates one final random number 326 on each (extended) clock pulse. It differs from the first embodiment in that the random number generator has been optimized to generate a certain number of bits for each final random number generated. This optimization is at the expense of flexibility.

The optimization is done by "unrolling" the first random number generator subprogram 140 disclosed in the first embodiment in FIG. 2. Instead of executing the loop 256, 258 shown in FIG. 5 a specified number of times, the number depending on the number of bits required in each intermediate random number generated, the routine inside the loop is duplicated once for each bit to be generated. This eliminates all of the loop overhead. Additionally, this allows the left shift 260 to be eliminated, replaced by offsetting the bits at each intermediate random bit 332 by one (see FIG. 7). The result is that each random bit generated requires only a single AND and XOR gate.

The second embodiment requires three input values, found in input registers: a seed register 300, an XOR mask register 302, and an address register 304 containing the starting address of a random number array 148. The values in these registers are identical to those in the corresponding registers for the first embodiment of the invention.

The second embodiment also has four single line input connections. The clock (CK) line 308 is used to clock the circuit. Each time the clock line 308 is pulsed, a single random number is generated. Note that the clock pulse cycle must be long enough that the circuit has reached steady state before the clock pulse is received. The minimum length of a clock pulse cycle can be computed by determining the number of gates that must be traversed, then multiplying by the gate delay for each gate. The choice of using level or edge triggering is usually dependent upon the underlying technology and computer. Note that since one final random number is generated each time the clock lead 308 is pulsed, the number of random numbers generated is determined by the number of clock pulses, rather than being provided in a count register 134 as found in embodiments one and three.

The INIT line 306 allows the circuit to be initialized. In the first random number generator 314, this allows the seed value provided in the input seed register 300 to be moved into the State4 clocked register 330, which contains the intermediate seed value. In the second random number generator 316, a pulse on the INIT line acts to clear the LPTR 382 and RPTR 384 clocked D Flip/flops (see FIG. 10). Finally, pulsing the INIT line 306 causes the address counter 318 to be initialized from the input array address register 304. Additionally, if it should ever be necessary to implement a count function on board, pulsing the INIT line 306 would cause the count counter to be initialized from an input count register.

Two additional input lines are provided. An ADDRess line 310 controls tristate buffers 320, 322 that when pulsed allow the address value calculated by the address counter 318 to be placed on the system bus 102. Similarly, the DATA line 312 controls tristate buffers that when pulsed allow the random number just generated to be placed on the system bus 102. The use of separate ADDR 310 and DATA 312 lines here allows this embodiment to be used in situations where address and data share the same position on the system bus. Note that the pulsing of the ADDR line 310 and the DATA line 312 will usually be done at the end of each cycle determined by pulsing the CLOCK line 308.

The first random number generator 314 uses the seed specified in the input seed register 300 and the mask value provided in the XOR mask register 302 to generate an intermediate random number each time the CLOCK line 308 is pulsed. These intermediate random numbers are used by the second random number generator 316 to generate final random numbers 324 to be placed on the system bus each time the DATA line 312 is pulsed.

The address counter 318 is a clocked counter with parallel load. It is initialized (parallel loaded) from the random number array address register 304 when the INIT line 306 is pulsed. Thereafter, each time the CLOCK line 308 is pulsed, the address counter 318 is incremented. The current value of the counter is placed on the system bus 102 whenever the ADDR line 310 is pulsed as the address 326 in which to store the just generated final random number 324.

Figure 7:
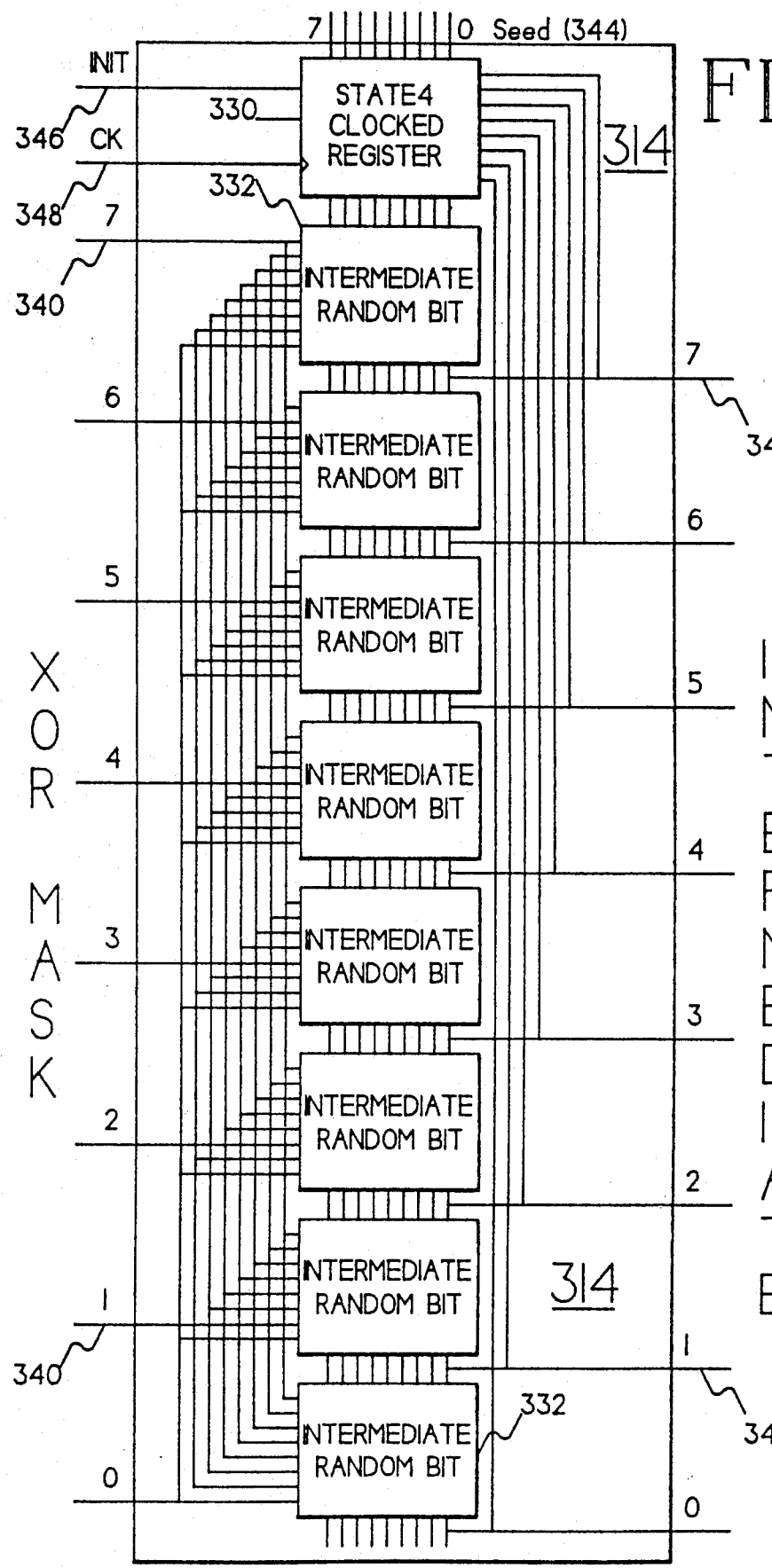
FIG. 7 is a circuit diagram showing the first random number generator for the second embodiment of the invention.

Referring now to FIG. 7, the first random number generator of the second embodiment, generating intermediate random numbers, is shown. Input to the first random number generator 314 consists of seed lines 344, XOR mask lines 340, an initialization (INIT) line 346 and a clock (CK) line 348. The seed input lines 344 are connected to the seed input register 300. The XOR mask lines 340 are connected to the XOR mask register 302. The INIT line 346 is connected to the external INIT line 306. The clock (CK) line 348 is connected to the external clock (CK) line 308.

The first random number generator 314 consists of a State4 clocked register 330 containing an intermediate seed value, and a number of intermediate random bit circuits 332 connected to each other in series, one such circuit for each bit required in the intermediate random number 342 generated by the generator 314. Each such intermediate random bit circuit 332 generates a single random bit, the first such circuit generating the most significant bit, and the last such circuit generating the least significant bit of the intermediate random number 342 output by the generator 314. The embodiment shown uses eight intermediate random number circuits, generating eight bit intermediate random numbers 342. The state4 clocked register 330 is initialized with the value from the input seed register 300. Thereafter, whenever the state4 clocked register 330 is pulsed, the register is updated with the latest intermediate random number 342 generated as the updated seed value.

Referring now to FIG. 8, a circuit for generating intermediate random bits 332 is disclosed. The most significant bit (Bit 7) of the circuit's input lines 352 is tested. If the most significant bit is set, the XOR mask lines 354 are XORed with the input bits 352 to the circuit. Notice that the output from the circuit 356 has been shifted one bit to the left from the input 352. Input line 0 is connected to output line 1, etc. The least significant output line (Bit 0) does not have a corresponding input bit. The most significant (Bit 7) input line 352 does not have a corresponding output line, but rather is used to determine whether to use the XOR mask 354.

Referring now to FIG. 9, the State4 clocked register 330 is shown. The register contains an intermediate seed value used by the first random number generator 324 to generate each successive intermediate random number 342. The register 330 has two sets of input lines, one set 360 is connected to the input seed register 300. The other set of input lines is connected to the previous intermediate random number 342.

The register 330 consists of a clocked D Flip/flop 368 for each bit in the register. This embodiment discloses eight flip flops corresponding to the eight bits in the intermediate random numbers 342 generated by the first random number generator 314. Whenever the clock (CK) line 366 is pulsed, either the input seed 360 or the previous intermediate random number 342 is used to set the corresponding D flip/flops 368. Eight output lines 362 are connected from the output of each corresponding D flip/flop 368 to the corresponding input lines 352 on the first intermediate random bit circuit 332.

Referring now to FIG. 10, further details of the second random number generator 316 of the second embodiment of the invention are disclosed. It has nine intermediate input lines 370, connected to the output of the first random number generator 316. Also, the second random number generator uses initialization (INIT) lines 374, connected to the external INIT line 306 and a clock (CK) line 372, connected to the external clock (CK) line 308.

The second random number generator 316 has several additional inputs. Each of the two first phase adders has an up/down line 378. These up/down lines determine whether the corresponding attached adder adds or subtracts the intermediate random number 370. Each second phase adder has a constant input (K) 380. This is an eight bit value added in phase two to the sum produced by the phase one adder. Note that adding a constant with its most significant bit set can be seen as equivalent to subtracting the number that is the two's complement of the constant. Both the up/down lines 378 and the second phase adder constants 380 are usually wired as constants. Some lines are connected to a constant high (usually +5 volts) value. The others to a constant low (usually ground) value.

The output from the second random number generator means 376 is the final random number 324 generated by the second embodiment of the random number generator.

The second random number generator 376 consists primarily of two clocked D Flip/flops 382, 384, and four adders, either parallel (look ahead) or ripple 386, 388, 390, 392. Each D flip/flop is connected to two adders in series. The two flip/flop, two adder combinations are used to calculate the left pointer (LPTR) and the right pointer (RPTR) values. In each case, the output from the D Flip/flop 382, 384 is one of the inputs to the first adder 386, 388. The other addenda are the lower order eight bits from the input intermediate random number 370. The up/down line 378 to each of the first phase adders is used to determine whether to add or subtract the intermediate random number input 370. The output of the first adders 386, 388, is one of the inputs to the second set of adders 390, 392. The other input to the second set of adders are the constants (K) 380 described above.

The high order bit (Bit 8) of the input 370 to the generator 316 is used to determine which of the two pointers (LPTR, RPTR) to use. If the bit is set, the LPTR output is selected. Otherwise, the RPTR output is selected. The appropriate value, LPTR, or RPTR, is the final random number output 376 that is put on the system bus 102 when the DATA line 312 is pulsed.

When the INIT line 374 is pulsed, the second random number generator is initialized. This is done by clearing both the two D flip flops 382, 384, and the two first phase adders 386, 388. Thereafter, whenever the clock line 372 is pulsed, the two eight bit D flip/flops 382, 384 are updated with the LPTR and RPTR values generated by the previous activation of the generator 316. Note that the determination whether to use LPTR or RPTR for the final random number generated 376 is based on the high order bit (Bit 8) of the intermediate random number 342 generated by the first random number generator 314. For best results, this bit should not be the most significant (high order) bit used as intermediate input 370 to the first set of adders 386, 388. This could easily be accomplished by expanding the first random number generator to generate nine bits, instead of eight, thus requiring a ninth intermediate random number bit circuit to be added to the first random number generator circuitry. However, the circuit will work as shown above by connecting the two high order lines (Bits 8 and 7) of the input 370 to the high order line (Bit 7) of the intermediate random number 342 generated by the first random number generator 314.

The third embodiment is described here but not shown as a separate figure. It is identical to the first embodiment shown in FIG. 2 except that an onboard processor is added to the circuitry for the invention. The added onboard processor is used to generate the random numbers, not the system processor 104 shown in FIG. 1. The use of such an onboard processor has the advantage of freeing up the system processor 104 for other work. Such an onboard processor can be optimized for the application. For example, a RISC architecture could be employed.

Although the present invention has been described with a certain degree of particularity, it is understood that the present disclosure has been made by way of example and that changes in details of structure may be made without departing from the spirit thereof.

What is claimed is:

1. An apparatus for generating random numbers comprised of
    first input register, said first input register specifying a random number seed,
    a second input register, said second input register specifying a random number mask,
    means to automatically control the number of random numbers to compute,
    first means for generating a series of intermediate random numbers coupled to said control means and coupled to said input means, and
    second means for generating final random numbers, coupled to said first generating means, each said final random number corresponding to and depending on a different intermediate random number.

2. An apparatus for generating random numbers as specified in claim 1 wherein said apparatus has a third input register, said third input register providing an address of an output array located in computer memory, means for storing said generated final random numbers in said output array utilizing said third input register.

3. An apparatus for generating random numbers as specified in claim 1 wherein said apparatus is attached to a general purpose computer by a bus.

4. An apparatus for generating a series of random numbers comprised of:
first means for generating a series of intermediate random numbers,
an intermediate register receiving each said intermediate random number from said first generating means,
second means for generating a series of final random numbers, coupled to said first generating means, each final random number corresponding to an intermediate random number stored in said intermediate register, and
the generation of each final random number utilizing the corresponding intermediate random number and a history of preceding intermediate random numbers.

5. An apparatus for generating a series of random numbers as described in claim 4 wherein said first generating means includes:
a first register for storing a binary number,
means for storing information representing the number of cycles of operation to be performed,
means for performing a cycle of operations the number of times represented by the information stored in said means for storing,
each said cycle having in the recited order:
means for shifting each bit of the binary number stored in said first register to the next higher order bit position such that the highest order bit is shifted out of said first register,
means for complementing selective predetermined bits of said binary number occupying said first register after each shifting operation, when the bit shifted out of said first register is a predetermined value, and
a second register for storing said bits shifted out of said first register.

6. An apparatus for generating a series of random numbers as described in claim 4 wherein said second generating means for generating each final random numbers includes:
two pointer registers for maintaining a plurality of pointers to a circular array located in computer memory,
means for decrementing the first said pointer register to traverse said array to the left to an extent determined by each said corresponding intermediate random number,
means for incrementing the second said pointer register to traverse said array to the right to an extent determined by each said corresponding intermediate random number,
means for automatically normalizing both said pointer registers to point within said circular array after the first said pointer register has been decremented and the second said pointer register has been incremented,
means for determining whether a specified bit in said intermediate random number is set or clear,
means of indexing said circular array with one of said point registers to determine the final random number that corresponds to said intermediate random number if said specified bit is determined to be set, and
means of indexing said circular array with the other said point register to determine the final random number that corresponds to said intermediate random number if said specified bit is determined to be clear.

7. An apparatus as described in claim 4 wherein said second means for generating each final random numbers includes:
two pointer registers for maintaining a plurality of pointers to a circular array located in computer memory,
means for incrementing said first pointer register to traverse said circular array by an amount determined by each said corresponding intermediate random number,
means for adding a specified amount to an amount determined by each corresponding intermediate random number,
means for incrementing said second pointer register to traverse said array by the amount calculated by said addition,
means for automatically normalizing both said pointer registers to point within said circular array after said two pointer registers have been incremented,
means for automatically determining whether a specified bit in said intermediate random number is set or clear,
first means for indexing said circular array, the amount said first indexing means is indexed depending on one of said pointer registers,
means for determining a first potential random number that corresponds to said intermediate random number, said means for determining a first potential random number utilizing said first indexing means,
second means for indexing said circular array, the amount said second indexing means is indexed depending on the other said pointer registers,
means for determining a second potential random number that corresponds to said intermediate random number, said means for determining a second potential random number depending on said second indexing means, and
means for selecting one said potential random number to be said final random number if said specified bit is set, and selecting the other potential random number to be said final random number if said specified bit is clear.

8. A method for generating a series of random numbers comprising the steps of: generating a series of intermediate random numbers
storing said intermediate random numbers in an intermediate register and
generating a series of final random numbers,
each said final random number corresponding to one of said intermediate random numbers stored in said intermediate register, and
the generation of each said final random number depending on the corresponding intermediate random number stored in said intermediate register and a history of the intermediate random numbers preceding said corresponding intermediate random number in said series of intermediate random numbers.

9. A method for generating a series of random numbers comprising the steps of:
generating a series of intermediate random numbers, and generating a series of final random numbers,
  each said final random number corresponding to one of said intermediate random numbers, and
  the generation of each said final random number depending on the corresponding intermediate random number and a history of the intermediate random numbers preceding said corresponding intermediate random number in said series of intermediate random numbers,
the generating of each said final random numbers including the steps of:
maintaining a first and a second pointer register, each said pointer register addressing locations within a circular array, and each said pointer register being incremented for each final random number,
incrementing said first pointer register to traverse said circular array to the left to an extent determined by said corresponding intermediate random number,
incrementing said second pointer register to traverse said circular array to the right to an extent determined by said corresponding intermediate random number,
normalizing both said pointer registers to address a location in said circular array,
determining a first potential random number by indexing said circular array by one of said pointer registers,
determining a second potential random number by indexing said circular array by the other of said pointer registers, and
selecting one of said potential random numbers to be said final random number if a specified bit in said intermediate random number is set, and to be the other said final random number if said bit is clear.

10. A method for generating a series of random numbers comprising the steps of:
generating a series of intermediate random numbers, and
generating a series of final random numbers,
  each said final random number corresponding to one of said intermediate random numbers, and
  the generation of each said final random number depending on the corresponding intermediate random number and a history of the intermediate random numbers preceding said corresponding intermediate random number in said series of intermediate random numbers,
the generating of each said final random numbers including the steps of:
maintaining a first and a second pointer register addressing locations within a circular array, each said pointer register being incremented in the same direction for each said final random number,
incrementing said first pointer register by an amount determined by said corresponding intermediate random number,
incrementing said second pointer register by the sum of a specified amount and an amount determined by said corresponding intermediate random number,
normalizing both said pointer registers to address a location in said circular array,
determining a first potential random number by indexing said circular array by one of said pointer registers,
determining a second potential random number by indexing said circular array by the other of said pointer registers, and
selecting one of said potential random numbers to be said final random number if a specified bit in said intermediate random number is set, and to be the other said final random number if said bit is clear.

* * * * *